US010419495B2

United States Patent
Barese et al.

(10) Patent No.: US 10,419,495 B2
(45) Date of Patent: Sep. 17, 2019

(54) LAWFUL INTERCEPT SYSTEMS AND METHODS IN LI SYSTEMS

(71) Applicant: Telefonaktiebolaget LM Ericsson (publ), Stockholm (SE)

(72) Inventors: Elio Barese, Naples (IT); Paolo D'Amora, Gragnano (IT); Vincenzo Paparo, Scafati (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 15/326,469

(22) PCT Filed: Jul. 25, 2014

(86) PCT No.: PCT/SE2014/050906
§ 371 (c)(1),
(2) Date: Jan. 13, 2017

(87) PCT Pub. No.: WO2016/013965
PCT Pub. Date: Jan. 28, 2016

(65) Prior Publication Data
US 2018/0213007 A1    Jul. 26, 2018

(51) Int. Cl.
*H04L 29/06*      (2006.01)
*H04L 12/851*     (2013.01)
(Continued)

(52) U.S. Cl.
CPC ........ *H04L 63/306* (2013.01); *H04L 47/2483* (2013.01); *H04L 47/30* (2013.01);
(Continued)

(58) Field of Classification Search
None
See application file for complete search history.

(56) References Cited

U.S. PATENT DOCUMENTS 8,116,307 B1 *  2/2012  Thesayi ................. H04L 45/00
                                                    370/389
8,711,851 B1 *  4/2014  Subramonian ........ H04L 69/165
                                                    370/389
(Continued)

FOREIGN PATENT DOCUMENTS

WO   WO-2013089605 A1 *  6/2013  ............. H04L 69/22
WO      2013147654 A1    10/2013

OTHER PUBLICATIONS

"Adding X4 interface for reporting O&M information elements," Jul. 22-24, 2014, 14 pages, 3GPP TSG-SA3LI Meeting #54, SA3LI14_123, Sprint, Amsterdam, Netherlands.
(Continued)

*Primary Examiner* — Joshua Joo
(74) *Attorney, Agent, or Firm* — NDWE LLP (57) ABSTRACT

A Lawful Intercept (LI) system and a method in a LI system comprising at least one Intercept Access Point (IAP) for intercepting communication traffic using User Datagram Protocol (UDP) and Transmission Control Protocol (TCP) packets in one or more communications networks. The IAP delivers the communication traffic as Communication Content (CC) to a Law Enforcement Agency (LEA) via a mediation functionality controlled by an administration functionality. The method comprises receiving CC as UDP and TCP; storing UDP and TCP CC in a buffer arrangement; and forwarding TCP CC or UDP CC via a first CC handover interface or via a second CC handover interface, separated from the first CC handover interface, to the LEA. A synchronization mechanism is provided in order to retransmit all IP packets lost over the new interface and a buffer capacity process.

13 Claims, 10 Drawing Sheets

(51) Int. Cl.
  *H04L 12/835*  (2013.01)
  *H04L 29/08*  (2006.01)
(52) U.S. Cl.
  CPC .......... *H04L 67/1095* (2013.01); *H04L 69/16*
      (2013.01); *H04L 67/2842* (2013.01)

(56) References Cited

U.S. PATENT DOCUMENTS

| | | | | |
|---|---|---|---|---|
| 2004/0095894 | A1* | 5/2004 | Eloranta | H04M 3/2281 370/252 |
| 2004/0228362 | A1* | 11/2004 | Maki | H04L 63/30 370/467 |
| 2005/0083970 | A1* | 4/2005 | Glickman | H04L 47/10 370/466 |
| 2009/0252151 | A1* | 10/2009 | Rappe | H04L 43/00 370/352 |
| 2009/0262741 | A1* | 10/2009 | Jungck | H04L 29/12066 370/392 |
| 2010/0235701 | A1* | 9/2010 | Choo | H04L 1/0002 714/748 |
| 2011/0154181 | A1* | 6/2011 | Kawa | H04L 63/00 715/234 |
| 2012/0155333 | A1* | 6/2012 | Yoon | H04L 12/28 370/259 |
| 2012/0170445 | A1* | 7/2012 | Perumanam | H04L 1/1838 370/216 |
| 2013/0003579 | A1* | 1/2013 | Lu | H04L 47/10 370/252 |
| 2013/0080394 | A1* | 3/2013 | Petruzzo | G06F 11/2082 707/659 |
| 2018/0157607 | A1* | 6/2018 | Gallagher | G06F 1/3234 |

OTHER PUBLICATIONS

International Search Report and Written Opinion, Application No. PCT/SE2014/050906, dated May 4, 2015, 9 pages.
"Lawful Interception (LI); Handover interface for the lawful interception of telecommunications traffic," 124 pages, ETSI ES 201 671, V3.1.1, (Oct. 2006), http://www.etsi.org/deliver/etsi_es/201600_ 201699/201671/03.01.01_50/es_201671v030101m.pdf.
International Preliminary Report on Patentability, International Application No. PCT/SE2014/050906, dated Jan. 31, 2017, 6 pages.
Communication pursuant to Article 94(3) EPC for EP Application No. 14750814.7 dated Jul. 11, 2019, 4 pages.

* cited by examiner

LAWFUL INTERCEPT SYSTEMS AND METHODS IN LI SYSTEMS

CROSS-REFERENCE TO RELATED APPLICATIONS

This application is a National stage of International Application No. PCT/SE2014/050906, filed Jul. 25, 2014, which is hereby incorporated by reference.

TECHNICAL FIELD

The present technology relates to Lawful Intercept systems and methods in such systems. More specifically, the provided technique introduces a new mechanism to reduce the bandwidth usage in the Interception Domain.

BACKGROUND

In the Lawful Interception scenario, where the Communication Content, CC, is captured and delivered to the LEA, Law Enforcement Agencies, for the purpose of investigating specified "crimes", the network operator revenues aren't growing nearly as fast as bandwidth usage.

Nevertheless, LEA demand performance, security and data integrity and network operators are making substantial investments to upgrade the capacity and performance of their networks because the growth of bandwidth usage impact the network's ability to ensure quality for all intercepted services.

Investments in the Interception Domain leave the operator at a competitive disadvantage but they also need to focus on controlling costs and so they are forced to use more-intelligently mechanism to manage the traffic on their networks in this domain.

Figure 1:
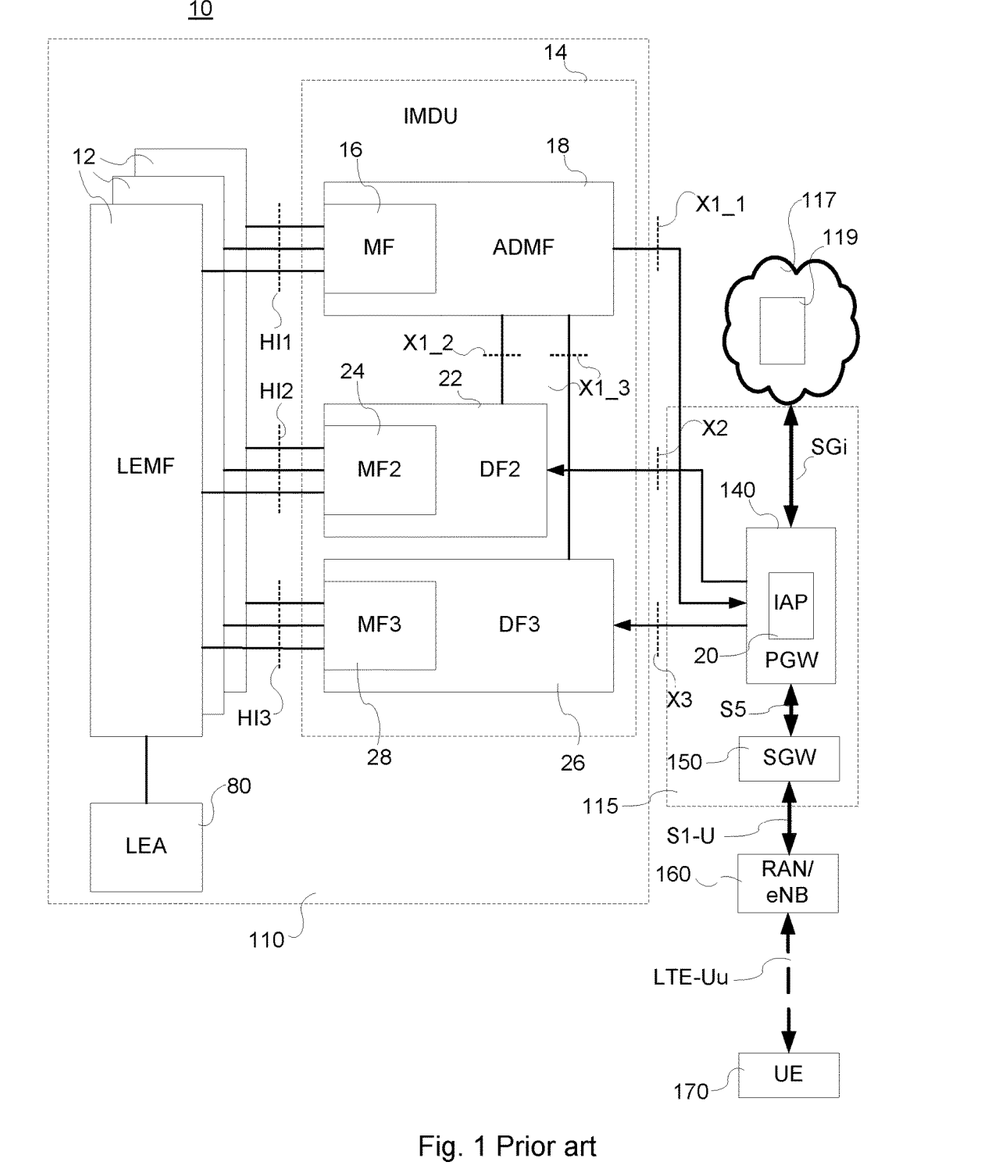
FIG. 1 is a block diagram of an exemplary network in which systems and methods described herein may be implemented.

FIG. 1 shows the standardized interfaces for LI.

FIG. 1 is a block diagram of an exemplary Lawful Interception, LI, system 110 and network 10 according to prior art. Said system and network comprises a number of entities. The exemplary LI system comprises a Law Enforcement Management Function, LEMF, 12 for requesting LI services of the LI system and collecting the intercepted information of Intercepting Access Points, IAPs, 20 in the system. The system shall provide access to the intercepted Content of Communications, CC, and Intercept Related Information, IRI, of a target and services related to the target on behalf of one or more Law Enforcement Agencies, LEAs 80. A target is a person of interest and/or user equipment possessed or used by the person of interest being surveyed by the LEA. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16 and an Administration Function, ADMF, 18. Said Mediation Function 16 and Administration Function 18 generate based on said received request a warrant comprising said one or more target identities, and sends said warrant towards an Intercept Control Element, ICE, in an Interception Access Point, IAP, 20 via an interface denoted X1_1. The IAP 20 may be connected to a node of a network, e.g. the Internet, a 3GMS (third generation Mobile Communications System), an Evolved Packet System (EPS) etc, from which it intercepts said Content of Communications and Intercept Related Information of a mobile target. Said CC and IRI are network related data. As reference to the standard model, the content of communication is intercepted in the IAP network node and it is based upon duplication of target communication payload without modification. The IAP sends IRI raw data via an interface X2 to a Delivery Function for IRI reporting, DF2, 22 and a Mediation Function of IRI, MF2, 24 that generates and delivers to a collection functionality a standardized IRI report based on the received IRI report. Said standardized IRI report is sent over a standardized interface HI2 to the LEMF 12. The IAP 20 also sends CC raw data via an interface X3 to a Delivery Function for CC reporting, DF3, 26 and a Mediation Function of IRI, MF3, 28 which generates and delivers to a collection functionality a standardized CC report based on the received CC report. Said standardized CC report is sent over a standardized interface HI3 to the requesting LEMF 12. The ADMF entity 16 controls and communicates with the Mediation Function and Delivery Function for IRI reporting, MF2/DF2, via the interface X1_2 and the Mediation Function and Delivery Function for CC, MF3/DF3, via the interface X1_3.

Together with the delivery functions it is used to hide from the third generation (3G) Intercepting Access Point IAP entities that there might be multiple activations by different Lawful Enforcement Agencies on the same target.

The HI2 and HI3-interfaces represent the interfaces between the LEA and two delivery functions. The delivery functions are used:
  to distribute the Intercept Related Information (IRI) to the relevant LEA(s) via HI2;
  to distribute the Content of Communication (CC) to the relevant LEA(s) via HI3.

According to known internet access services, all the IP streams related to a given target is intercepted and delivered as a whole session data flow regardless any service used within an interception session.

In the example in FIG. 1, the IAP 20 is connected to, or contained within a user plane gateway, PGW, in a node 140 in a CN 115. The IAP may be connected to any type of user plane gateway, e.g. SGW, PGW and GGSN. The same interfaces are also used for control plane nodes like MME and HLR/HSS. Streams of content flow through the user plane gateway in both directions to the UE and from the UE. In one direction, content may come from any site within the CN or any site 119 in a connected communications network 117, e.g. LAN, WLAN, WAN, RAN, etc. The flow passes the (S)Gi interface connected to the user plane gateway. LI is therefore possible to perform. The flow passes an interface S5 between the PGW node 140 and a SGW node 150, and through an interface S1-U between the SGW node 150 and a RAN/eNB 160 comprising one or more radio base stations, e.g. eNB. The radio base station forwards the content flow via the air interface LTE-Uu to the designated UE 170.

In the other direction, flow of packets comprising content generated by the UE passes the same interfaces, nodes and gateways. When passing the IAP entity, LI is performed.

As described above, a network shall provide access to the intercepted CC and the IRI of the mobile target and services related to the target, e.g. Call Forwarding, on behalf of LEAs. The LEA provides the intercept request, e.g. lawful authorization or warrant to the Communication Service Provider, CSP. The intercept request identifies, at a minimum, the target, the type of intercept i.e., IRI-only, or IRI and CC that is authorized, the authorized period for interception, and the LEA delivery address(-es) for the intercepted information.

The CSP shall securely administer the intercept (e.g., to activate, deactivate, show, or list targets) within the network as quickly as possible. The CSP's administration function shall use appropriate authentication and audit procedures.

As shown, the mediation function sends CC towards LEA over HI3 interface. The HI3 interface is based on Transmission Control Protocol, TCP, in order to ensure data integrity. The data integrity is guaranteed by the acknowledged mechanism of transmitted data, i.e. reliability of TCP protocol. According this mechanism, the receiver is able to confirm the receiving of single TCP packets or cumulative TCP stream through an ACK message towards the sender. Any not acknowledged packet/stream represents a lost packet/stream and then is retransmitted. The same happens for corrupted packets. The acknowledged mechanism assures the data integrity but represents an evident overhead for the communication.

Most of IAP uses an X3 interface based on User Datagram Protocol, UDP, protocol meanwhile the HI3 interface is based on TCP. In this case the TCP acknowledged mechanism represents the price to pay, in term of bandwidth usage, in order to have data integrity. Considering the increment of multimedia flows, e.g. video streaming, VoIP, etc., between the mediation function and LEA the HI3 interface may become a bottleneck.

SUMMARY

One object of the following disclosure is to introduce mechanisms to save the bandwidth in order to avoid the HI3 link to become a bottleneck.

The provided technique introduces a new mechanism to reduce the bandwidth usage in the Interception Domain combining the benefits provided by both protocols, UDP and TCP.

According to one aspect, a method and embodiments thereof are provided for achieving at least one of the above stated objects. The method is performed in a Lawful Intercept, LI, system comprising at least one Intercept Access Point, IAP, for intercepting communication traffic using User Datagram Protocol, UDP, packets and Transmission Control Protocol, TCP, packets in one or more communications networks. The IAP delivers said communication traffic as Communication Content, CC, to a Law Enforcement Agency, LEA, via a mediation functionality controlled by an administration functionality. The method comprises the steps of receiving CC as UDP and TCP, storing UDP and TCP CC in a buffer arrangement, and forwarding TCP CC or UDP CC via a first CC handover interface or via a second CC handover interface separated from the first CC handover interface to the LEA.

According to further one aspect, a Lawful Intercept, LI, system and embodiments thereof are provided. The LI system comprises at least one Intercept Access Point, IAP, for intercepting communication traffic using User Datagram Protocol, UDP, packets and Transmission Control Protocol, TCP, packets in one or more communications networks. The IAP delivers said communication traffic as Communication Content, CC, to a Law Enforcement Agency, LEA, via a mediation functionality controlled by an administration functionality. The mediation functionality comprises a buffer controller comprising a communication interface and a processing circuitry. Said buffer controller is adapted to operatively perform receiving CC as UDP and TCP by means of the communication interface, storing UDP and TCP CC in a buffer arrangement, and forwarding TCP CC or UDP CC via a first CC handover interface, HI3, or via a second CC handover interface HI4 separated from the first CC handover interface to the LEA.

One advantage of the provided solution is that it is able to deliver CC to the LEA offering a low bandwidth usage of UDP combined with the reliability mechanism of the TCP.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

The following described technique arises from the need to handle the incredible amount of data produced by the convergence of all services on the IP networks.

The solution is based on:
The introduction of a new HI4 interface based on UDP delivery protocol for payload transmission;
The introduction of a Synchronization mechanism in order to retransmit all IP packets lost over the new interface HI4.

The LEA will receive the CC over HI4 via UDP protocol and will perform an on demand or periodic synchronization in order to synchronize the eventual loss packets.

The payload synchronization is requested over HI1 interface, or alternatively over a new interface, through the introduction of new asynchronous request messages. LI system could use the buffering feature in order to store the CC packets that could be requested by the LEA.

The proposed new CC interface HI4 will have the same characteristics of the standard CC interface HI3, as defined in reference [1], with the difference that will be based on UDP. It may be an optional handover interface HI for CC and it may be used only if the LEA is requesting the mechanism solution proposed in this disclosure.

According to one aspect of the mechanism solution, a method S100 is provided to deliver CC to the LEA offering a low bandwidth usage of UDP combined with the reliability mechanism of the TCP.

Figure 2:
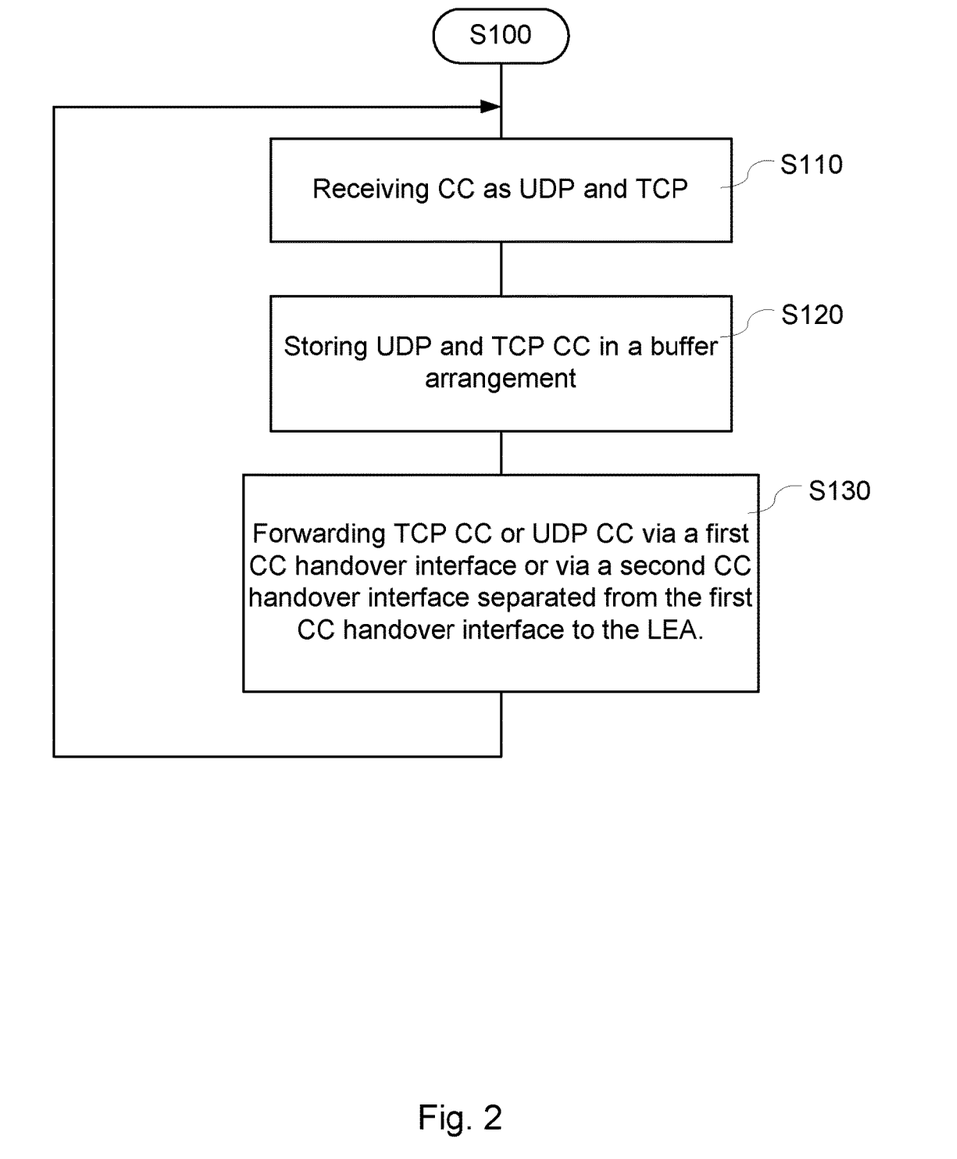
FIG. 2 is a flowchart illustrating a method in a Lawful Intercept system.

FIG. 2 is a flowchart illustrating a method S100 in a Lawful Intercept system.

The LI system comprises at least one Intercept Access Point for intercepting communication traffic using UDP and TCP in one or more communications networks. The LI system delivers said communication traffic as CC to a LEA via a mediation functionality controlled by means of an administration functionality. The method comprises:

S110:—receiving CC as UDP and TCP;
S120:—storing UDP and TCP CC in a buffer arrangement;
S130:—forwarding TCP CC or UDP CC via a first CC handover interface or via a second CC handover interface separated from the first CC handover interface to the LEA.

It is also proposed a Synchronization mechanism in order to retransmit all IP packets lost over the new interface HI4.

Figure 3:
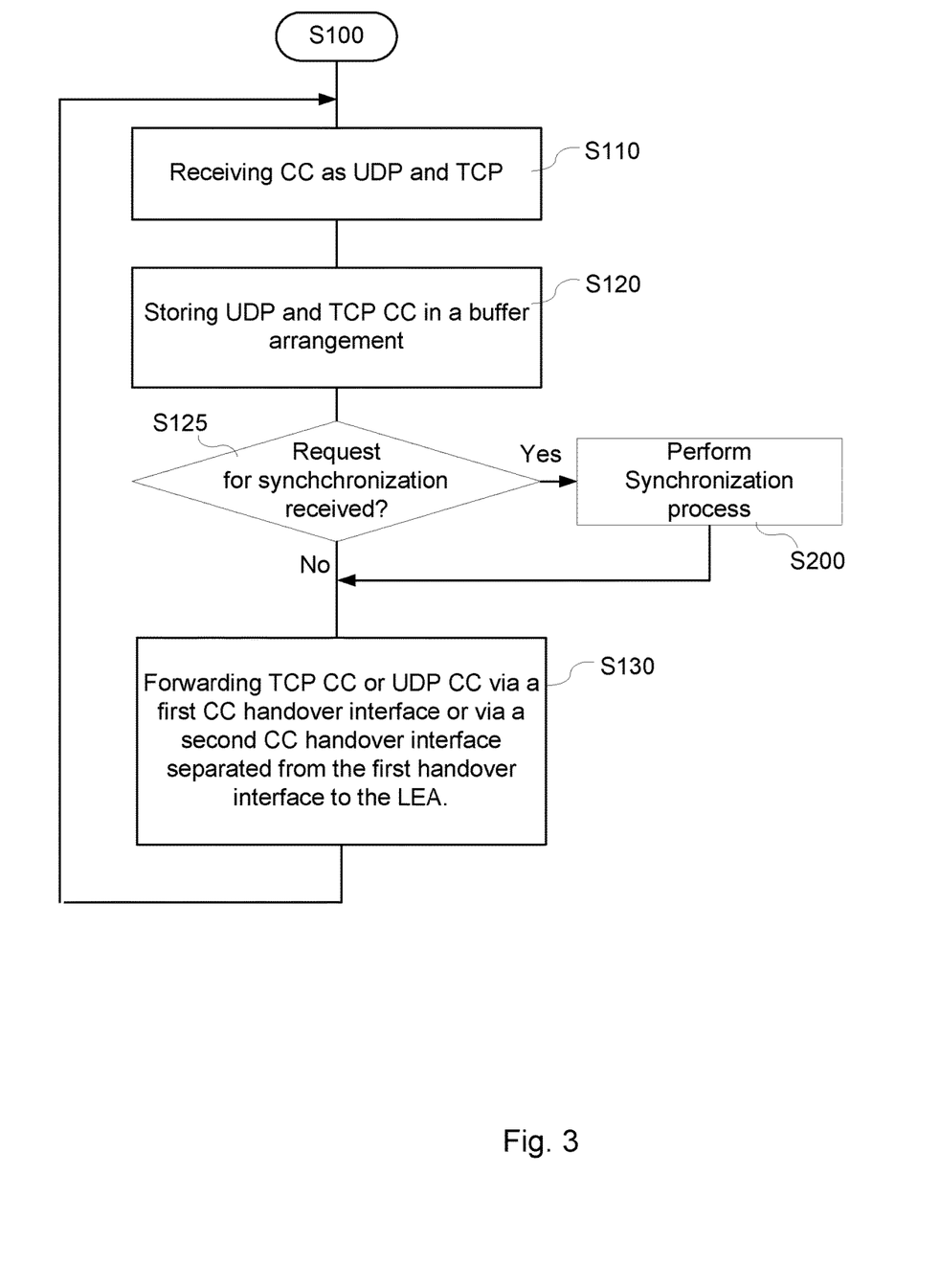
FIG. 3 is a flowchart illustrating an embodiment of the method in a Lawful Intercept system.

FIG. 3 is a flowchart illustrating an embodiment of the method S100 in a Lawful Intercept system.

The method comprises a synchronization process S200 for retransmission of lost UDP packets.

As illustrated in the flowchart of FIG. 3, the embodiment comprises a test step, S125:

Request for synchronization received?

This step is in the illustrated embodiment placed between step S120 and S130. It should be understood that said test step could be placed anywhere in the method.

If a request for synchronization has been received, yes, the method in the LI system performs the synchronization process, S200, which is described in connection to the flowchart in FIG. 5.

When a request for synchronization is not received and waiting to be executed, the steps S110, S120 and S130 of the method S100 are performed as usual.

The synchronization process may be performed parallel with the steps S110, S120 and S130 of the method S100.

Figure 4:
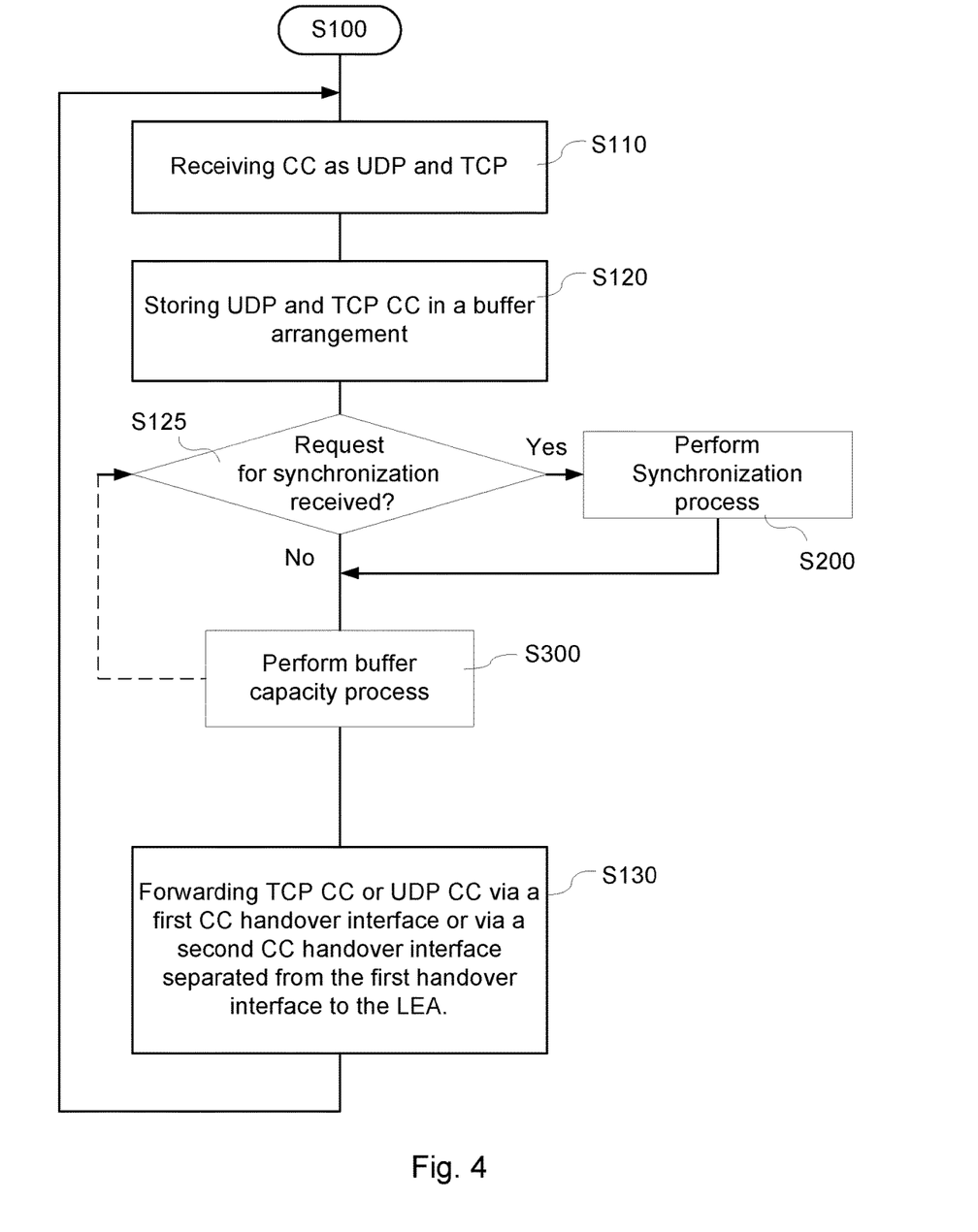
FIG. 4 is a flowchart illustrating further one embodiment of the method S100 in a Lawful Intercept system.

Further, one embodiment of the method is illustrated in the flowchart in FIG. 4.

The embodiment comprises a buffer capacity process, S300, which is described in connection to the flowchart in FIG. 6. In addition, another embodiment of the method S100 is presented in connection to FIG. 7.

Optionally, the embodiment may also comprise the synchronization process S200 for retransmission of lost UDP packets.

The buffer capacity process may be performed parallel with the steps S110, S120 and S130 of the method S100.

Figure 5:
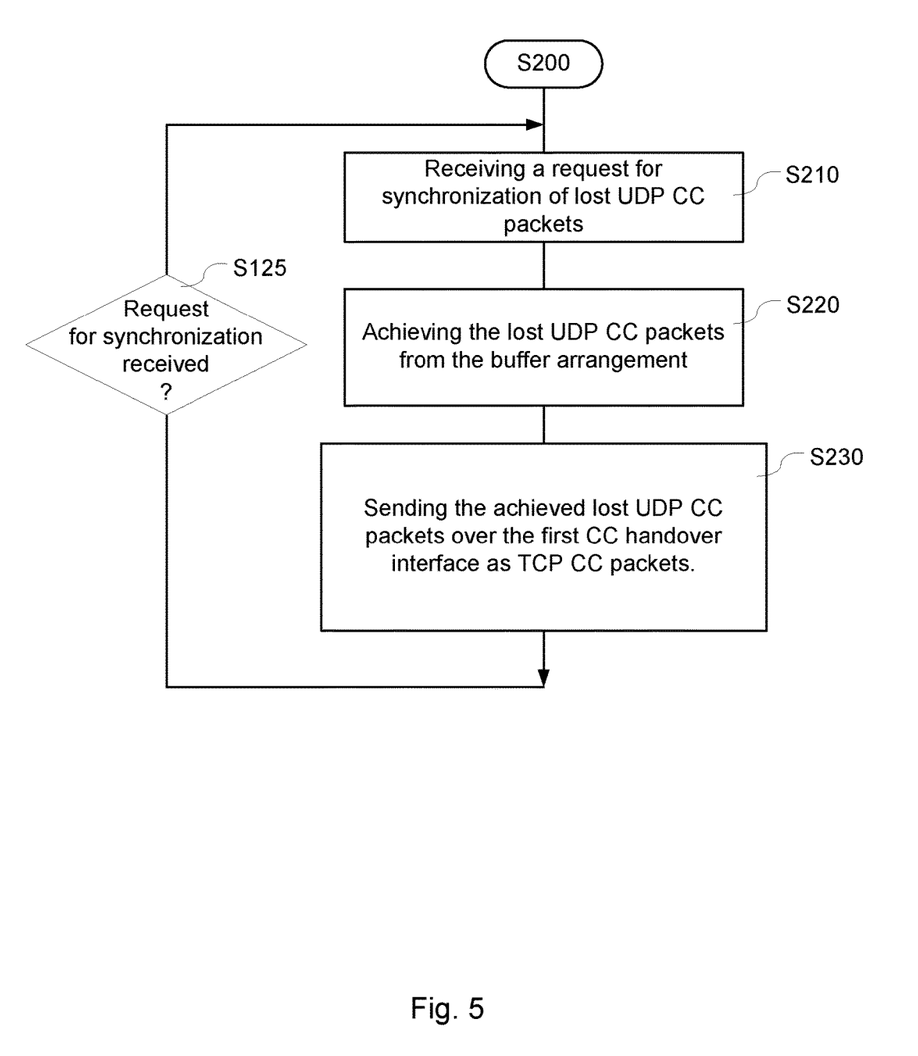
FIG. 5 is a flowchart synchronization process S200 for retransmission of lost UDP packets.

FIG. 5 is a flowchart synchronization process S200 for retransmission of lost UDP packets.

Said process comprises the steps of:

S210:—receiving a request for synchronization of lost CC packets sent over HI4;
S220:—achieving the lost CC packets from the buffer arrangement;
S230:—sending the achieved CC packets over the first CC handover interface as TCP CC packets.

When the lost CC packets have been retransmitted in step S230, the method S200 and LI system waits for new synchronization request to be received in a step S125. When a new request is received, the synchronization process is triggered to start.

The receiving step may involve receiving the request for synchronization of lost UDP CC packets from the LEA via the administration functionality, ADMF.

The request for synchronization may be designed to comprise a flow identifier of a specific CC stream generated by an intercepted user, and LI-header sequence numbers of the lost UDP CC packets.

Figure 6:
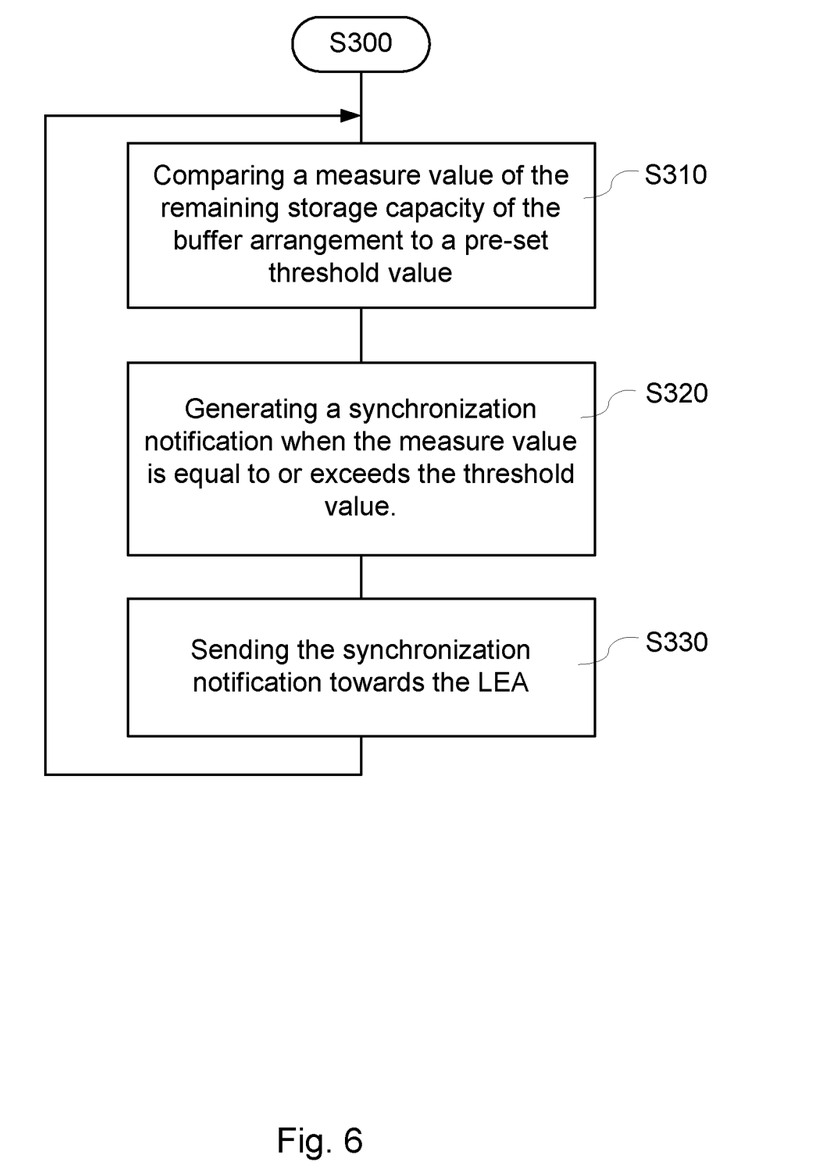
FIG. 6 is a flowchart illustrating a buffer capacity process.

FIG. 6 is a flowchart illustrating the buffer capacity process, S300, as mentioned above in connection to the embodiment of the method S100 illustrated in FIG. 4.

Said process comprises the step of:

S310:—comparing a measure value of the remaining storage capacity of the buffer arrangement to a pre-set threshold value;
S320:—generating a synchronization notification when the measure value is equal to or exceeds the threshold value to the administration functionality;
S330:—sending the synchronization notification towards the LEA.

Figure 7:
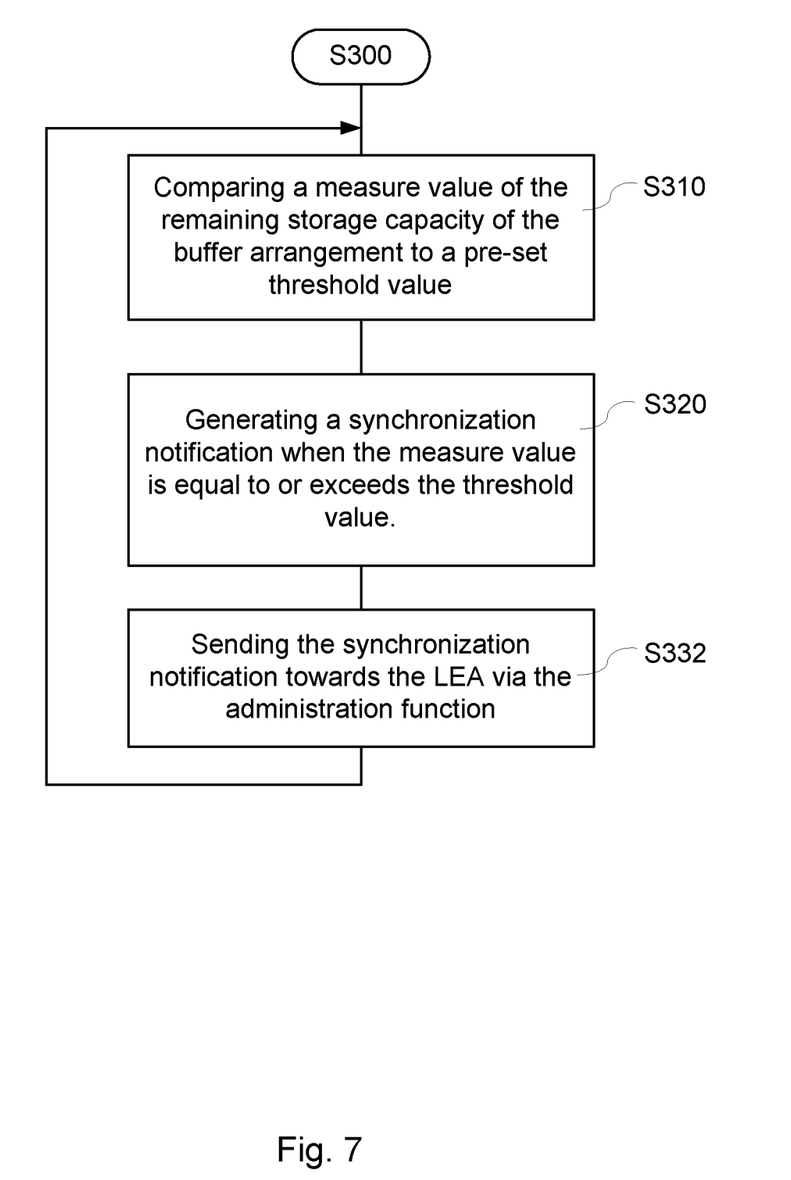
FIG. 7 is a flowchart illustrating an embodiment of the buffer capacity process.

FIG. 7 is a flowchart illustrating an embodiment of the buffer capacity process, S300, as mentioned above in connection to the embodiment of the method S100 illustrated in FIG. 4.

The step of sending of the synchronization notification may further be modified:

S332:—sending the synchronization notification towards the LEA via the administration functionality.

Figure 8:
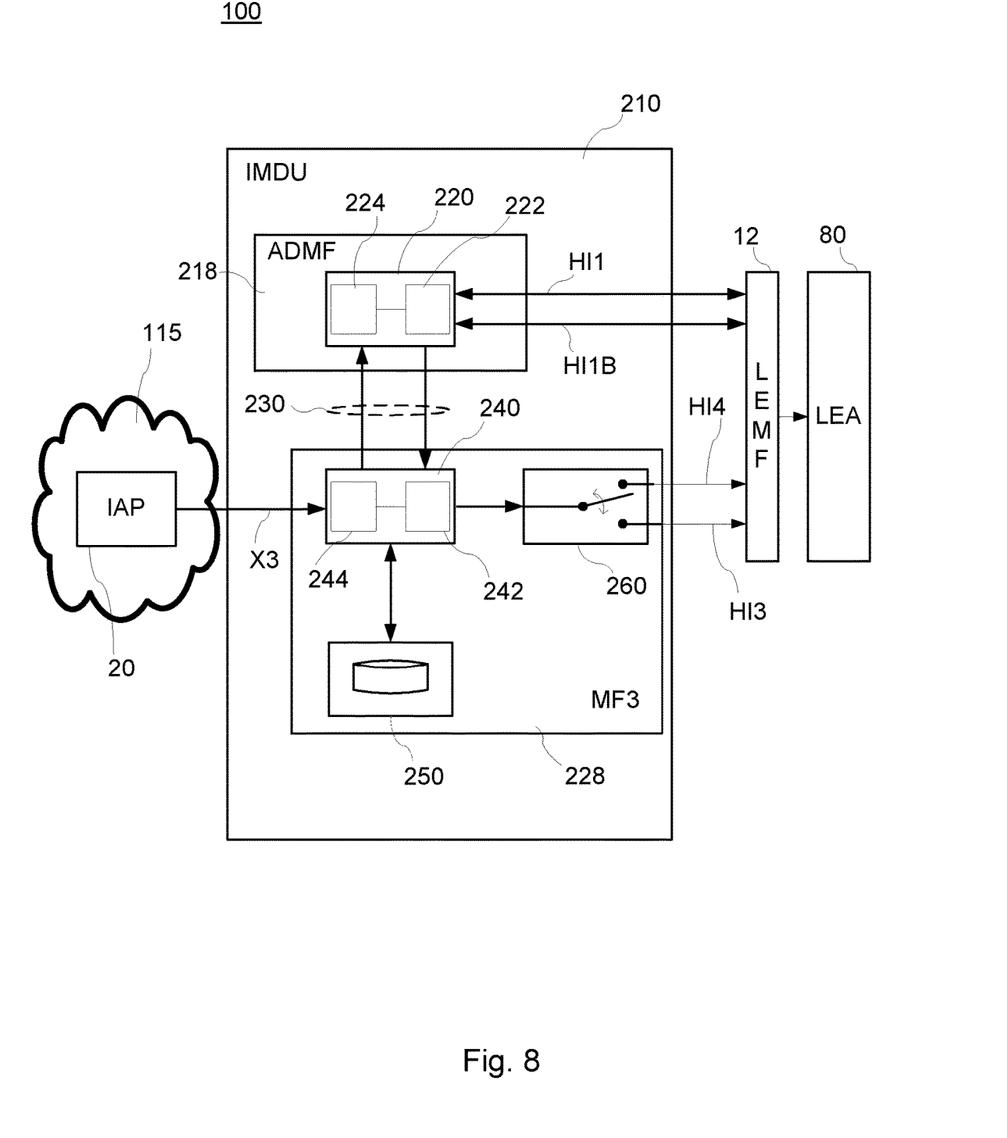
FIG. 8 is a block diagram illustrating an implementation of the method in a schematic LI system.

FIG. 8 is a block diagram illustrating an implementation of the method in a schematic LI system. The block diagram is simplified for illustrating the blocks and units for implementing the presented method S100 with its sub-processes S200 and S300 and embodiments thereof. Thus, the LI system 100 comprises also blocks and units as illustrated in FIG. 1 to be able to provide the necessary services, but said blocks and units are not necessary to a person skilled in the art to understand how said method is implemented in a LI system.

The LI system 100 comprises an Intercept Mediation and Delivery Unit, IMDU, 210, which is connected to an Intercept Access Point, IAP, 20 in a communications network, 115, e.g. a telecommunications network. The IAP provides copies of selected subscribers', i.e. targets', digital communications traffic, Communications Content CC. Said CC is sent over an interface X3 the Mediation Function 3 unit 228, MF3. The CC may comprise both UDP and TCP packets depending on the kind of traffic content that is intercepted.

The MF3 228 is controlled by an administration functionality block 218, ADMF. The MF3 comprises a buffer controller 240 that comprises a communication interface 242 and a processing circuitry 244. The buffer controller controls a buffer arrangement 250 to which the CC is stored to be retransmitted due to loss of packets when delivered to the LEA 80. The buffer arrangement 250 may comprise a great number of buffer storages providing enough storage capacity for storing regular communication traffic of plenty of intercepted targets.

The buffer arrangement 250 is a data storage device used to store the CC packets while it is being delivered by the DF3 on the proposed interface HI4. This block could be a new physical memory storage.

The mediation functionality unit MF3 228 further comprises an IP packets router 260, which is adapted to forward TCP CC and UDP CC via a first handover interface for CC, HI3, or over a second CC handover interface HI4 separated from the first CC handover interface HI3 to the LEA 80 via the LEMF 12 depending on an indication indicating whether the CC comprises TCP or UDP packets, which indication is provided by the buffer controller 240. Actually, the LEA 80 may select whether the different CCs should be delivered over HI3 or HI4.

The IP Packets Router block 260 is responsible to route CC packets over HI3 or HI4 depending on the indication provided by the buffer controller 240.

The buffer controller 240 is adapted to operatively perform the steps S110, S120 and S130 of the method S100:
  receiving CC as UDP and TCP by means of the communication interface 242;
  storing UDP and TCP CC in a buffer arrangement 250;
  forwarding TCP CC or UDP CC via a first CC handover interface HI3 or via a second CC handover interface HI4 separated from the first CC handover interface to the LEA.

The mediation functionality 228 is adapted to support a synchronization process for retransmission of lost UDP packets by means of the buffer controller 240, wherein the buffer controller 240 is adapted to operatively perform the steps S210, S220 and S230 of the synchronization process S200:
  receiving a request for synchronization of lost UDP CC packets;
  achieving the lost UDP CC packets from the buffer storage;
  sending the achieved lost UDP CC packets over the first CC handover interface as TCP CC packets.

The buffer controller 240 may be adapted to receive the request for synchronization of lost UDP CC packets from the LEA via the administration functionality ADMF 218.

The request for synchronization comprises a flow identifier of a specific CC stream generated by an intercepted user, and LI-header sequence numbers of the lost UDP CC packets.

The buffer controller 240 further is adapted to operatively perform the buffer capacity process, S300, comprising the steps S310, S320 and S330, i.e. the steps of:
  comparing a measure value of the remaining storage capacity of the buffer storage to a pre-set threshold value;
  generating a synchronization notification when the measure value is equal to or exceeds the threshold value;
  sending the synchronization notification towards the LEA.

The buffer controller may be adapted to operatively send the synchronization notification towards the LEA via the administration functionality ADMF 218.

The administration functionality ADMF 218 of the LI system is provided with a synchronization handler 220, which comprises a communication interface 222 and a processing circuitry 224. Said synchronization handler 220 is adapted to receive a request for synchronization of lost UDP CC packets from the LEA 80, and to send the request for synchronization of lost UDP CC packets from the LEA 80 to the buffer controller 240.

The communication interface 222 of the synchronization handler 220 may be adapted to receive the request for synchronization of lost UDP CC packets from the LEA via an handover interface HI1B separate from the standardized handover interface, HI1. The synchronization handler 220 may be adapted to operatively receive a synchronization notification from the buffer controller 240, and to send the synchronization notification towards the LEA 80.

The synchronization handler 220 may further be adapted to send the synchronization notification towards the LEA 80 via an handover interface HI1B separate from the standardized handover interface, HI1.

Thus, the synchronization handler block 220 interacts with the buffer controller 240 and with the LEA 80 via HI1 interface or the handover interface HI1B which is a separate interface from the standardized handover interface, HI1. The synchronization handler block 220 is mainly responsible for handling the interaction with the LEA through the following messages:

1. SyncRequest

2. SyncNotify

1. The SyncRequest is sent from the LEA when a CC synchronization is requested. A possible syntax could be:

SyncRequest (FlowId; SeqNumbers)

The FlowId is the flow identifier of a specific CC stream generated from a specific intercepted user. The SeqNumbers contains the sequence numbers related to loss CC packets. Note that the sequence number is referred to the "sequence number" in the LI-Header.
The synchronization handler block 220 sends the SyncRequest towards the buffer controller 240 in order to trigger the packets retransmission.

2. The SyncNotify is the message created by the buffer controller 240 and forwarded to LEA through the synchronization handler block 220 in order to notify that the buffer arrangement 250 is almost full. Basing on this message the LEA 80 shall notify an eventual CC packets retransmission or the possibility to empty the buffer arrangement 250 for example moving the packets on supplementary storage in order to guarantee again the data recovery in a configurable time window.

To summarize the function of the buffer controller block 240, it receives the incoming CC packets, handles the buffer arrangement 250 and interacts with the synchronization handler block 220 and IP packets router 260.

The buffer controller stores all incoming CC packets into the buffer arrangement 250 and sends them towards the IP Packets Router block 260 providing the indication about the HI interface to use, HI3 or HI4. For example, HI4 is the default indication meanwhile HI3 is used only for the retransmission purposes.

When buffer controller block 240 receives the SyncRequest message from the synchronization handler 220, it gets them from the buffer arrangement 250 and sends them towards the IP Packets Router block 260 specifying HI3 as interface. After that, the buffer controller 240 may be adapted to remove these packets from the buffer arrangement 250.

Moreover the buffer controller 240 monitors periodically the capacity of the buffer arrangement 250 in order to detect an overflow through a threshold mechanism. If the threshold is reached it will send a SyncNotify message towards the synchronization handler block 220.

The above described technique may be implemented in digital electronically circuitry, or in computer hardware, firmware, software, or in combinations of them. Apparatus of the technique may be implemented in a computer program product tangibly embodied in a machine readable storage device for execution by a programmable processor in a processing circuitry; and method steps of the technique may be performed by a programmable processor in a processing circuitry executing a program of instructions to perform functions of the technique by operating on input data and generating output.

The buffer controller 240 comprise a processing circuitry 244, and the synchronization handler 220 comprise a processing circuitry 224. The above described methods and embodiments thereof may be implemented in a computer program product tangibly embodied in a machine readable storage device for execution by a programmable processor in a processing circuitry; and method steps of the method may be performed by a programmable processor in the processing circuitry executing a program of instructions to perform functions of the technique by operating on input data and generating output.

The processing circuitry 224, 244 comprises at least one processor connected to one or more memory storage devices comprising computer programs for controlling and operating said at least one processors. The processor will receive instructions and data from, e.g. a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

Figure 9:
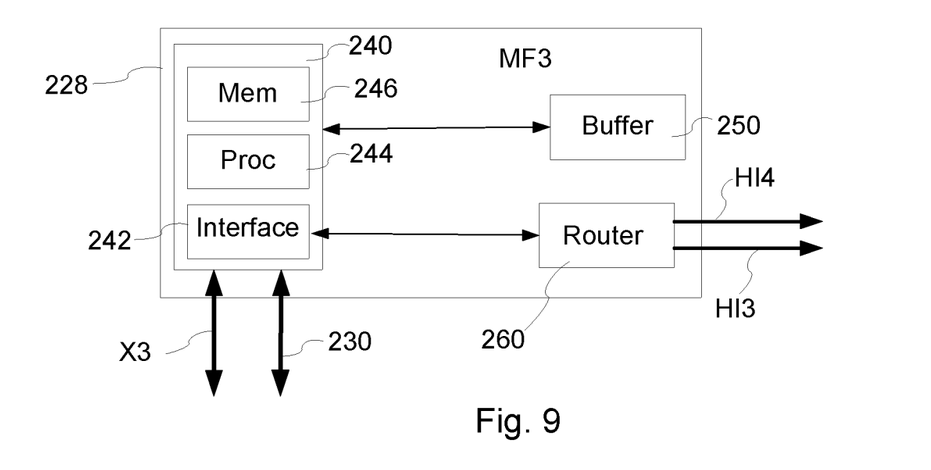
FIG. 9 is a block diagram illustrating one implementation of the mediation function MF3 comprising a buffer controller.
Figure 10:
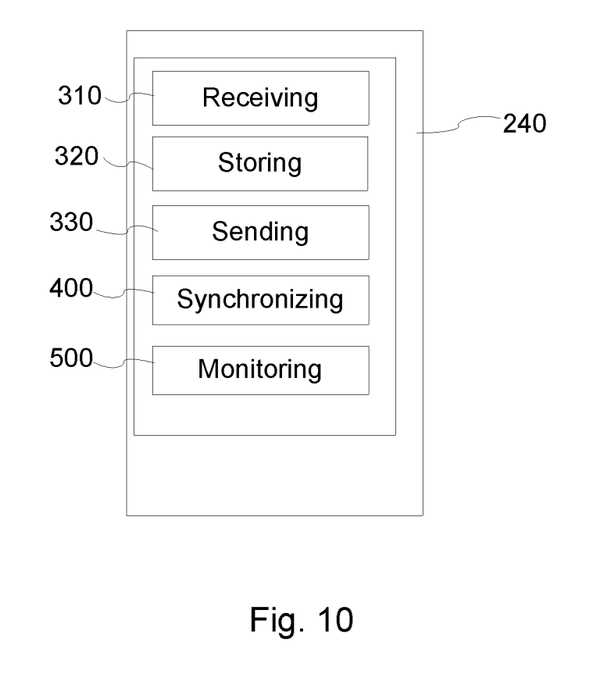
FIG. 10 is a block diagram illustrating another implementation of the buffer controller.

Alternative implementation embodiments of the mediation function MF3 is illustrated in FIGS. 9 and 10.

FIG. 9 is a block diagram illustrating one implementation of the mediation function MF3 comprising the buffer controller 240.

The mediation functionality unit MF3 228 comprises a buffer controller 240, a packets router 260, and a buffer arrangement 250. The buffer controller 240 is capable of communicating with an ADMF via interface 230, an IAP via interface X3 and with the buffer arrangement 250 and packets router 260 via internal interfaces. The interface 230 may be the interface X1_3.

The packets router 260, which is adapted to forward TCP CC and UDP CC via a first handover interface for CC, HI3, or over a second CC handover interface HI4 separated from the first CC handover interface HI3. The IP Packets Router block 260 is responsible to route CC packets over HI3 or HI4 depending on the indication provided by the buffer controller 240.

The buffer controller 240 comprises a communication interface 242 and a processing circuitry 244. The processing circuitry 244 communicates with the different mentioned interfaces by means of the communication interface 242. The processing circuitry 244 may be a programmable processor, which is connected to a memory storage 246 for storing instruction code and data for running the programmable processor. By means of the programmable processor and memory storage 246 is the buffer controller 240 adapted to:
  receiving CC as UDP and TCP by means of the communication interface;
  storing UDP and TCP CC in a buffer arrangement;
  forwarding TCP CC or UDP CC via a first CC handover interface (HI3) or via a second CC handover interface (HI4) separated from the first CC handover interface to the LEA.

The buffer controller 240 is further adapted to support the synchronization process by operatively performing:
  receiving a request for synchronization of lost UDP CC packets;
  achieving the lost UDP CC packets from the buffer storage;
  sending the achieved lost UDP CC packets over the first CC handover interface as TCP CC packets.

The buffer controller 240 may in one implementation be adapted to operatively perform the step of:
  receiving the request for synchronization of lost UDP CC packets from the LEA via the administration functionality.

The buffer controller 240 is further adapted to operatively perform the step of:
  comparing a measure value of the remaining storage capacity of the buffer storage to a pre-set threshold value;
  generating a synchronization notification when the measure value is equal to or exceeds the threshold value to the administration functionality;
  sending the synchronization notification towards the LEA.

The buffer controller 240 is further adapted to operatively perform the step of:
  sending the synchronization notification towards the LEA via the administration functionality.

FIG. 10 is a block diagram illustrating another implementation of the the buffer controller 240.

According to this embodiment, the buffer controller 240 comprises a receiving unit 310 that is adapted to receive CC as UDP and TCP by means of the communication interface, a storing controlling unit 320 that is adapted to store UDP and TCP CC in a buffer arrangement, and a sender unit 330 that is adapted to forward TCP CC or UDP CC via a first CC handover interface (HI3) or via a second CC handover interface (HI4) separated from the first CC handover interface to the LEA.

The buffer controller 240 may further comprise a synchronization unit 400 that is adapted to support the synchronization process S200 by operatively performing the steps of said process:
  receiving a request for synchronization of lost UDP CC packets;
  achieving the lost UDP CC packets from the buffer storage;
  sending the achieved lost UDP CC packets over the first CC handover interface as TCP CC packets;
  receiving the request for synchronization of lost UDP CC packets from the LEA via the administration functionality.

The buffer controller 240 may further comprise a buffer monitoring unit 500 adapted to perform the process S300 of monitoring the buffer arrangement, which process may comprise the steps of:
  comparing a measure value of the remaining storage capacity of the buffer storage to a pre-set threshold value;
  generating a synchronization notification when the measure value is equal to or exceeds the threshold value to the administration functionality;
  sending the synchronization notification towards the LEA.

Figure 11:
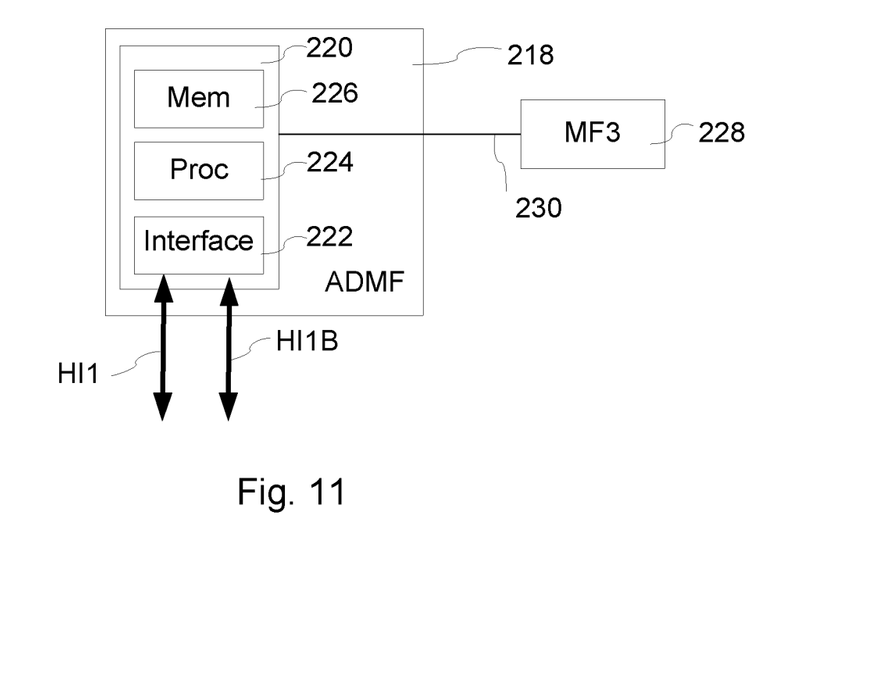
FIG. 11 is a block diagram illustrating one implementation of a synchronization handler in an ADMF unit of an IMDU.
Figure 12:
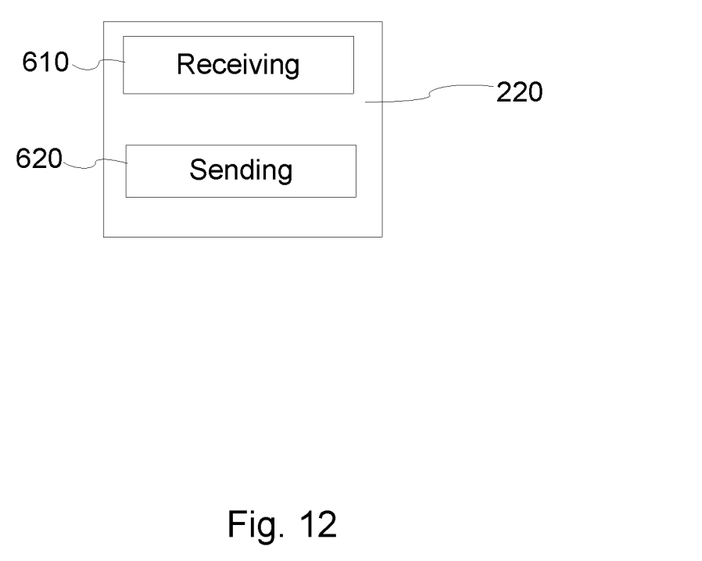
FIG. 12 is a block diagram illustrating another implementation of the synchronization handler.

Alternative implementation embodiments of a synchronization handler are illustrated in FIGS. 11 and 12.

FIG. 11 is a block diagram illustrating one implementation of the synchronization handler 220 in an ADMF unit 218 of an IMDU.

The ADMF unit 218 comprises a synchronization handler 220, which is capable of communicating with a LEA via an LEMF and interfaces HI1 and HI1B, and a Mediation Function unit MF3 228 via an interface 230. The interface 230 may be the interface X1_3.

The synchronization handler 220 comprises a communication interface 222 and a processing circuitry 224. The processing circuitry 224 communicates with the different mentioned interfaces by means of the communication interface 242. The processing circuitry 224 may be a programmable processor, which is connected to a memory storage 246 for storing instruction code and data for running the programmable processor. The synchronization handler 220 is by means of the programmable processor circuitry and memory storage 226 adapted to:

receiving a request for synchronization of lost UDP CC packets from the LEA;
    sending the request for synchronization of lost UDP CC packets from the LEA to the buffer controller.

The synchronization handler 220 may further be adapted to receive the request for synchronization of lost UDP CC packets from the LEA via an handover interface HI1B separate from the standardized handover interface, HI1.

The synchronization handler 220 may by means of the programmable processor circuitry and memory storage 226 be adapted to:

receiving a synchronization notification from the buffer controller;
    sending the synchronization notification towards the LEA.

The synchronization handler 220 may by means of the programmable processor circuitry and memory storage 226 be adapted to send the synchronization notification towards the LEA via an handover interface HI1B separate from the standardized handover interface, HI1.

FIG. 12 is a block diagram illustrating another implementation of the synchronization handler 220.

According to this embodiment, the synchronization handler 220 comprises a receiver unit 610 adapted to receive a request for synchronization of lost UDP CC packets from the LEA, and a sending unit 620 adapted to send the request for synchronization of lost UDP CC packets from the LEA to the buffer controller.

The receiver unit 610 may further be adapted to receive a synchronization notification from the buffer controller, and the sending unit 620 may be adapted to send the synchronization notification towards the LEA. Said sending unit 620 may alternatively be adapted to send the synchronization notification towards the LEA via an handover interface HI1B separate from the standardized handover interface, HI1.

The entities, blocks and units described above with reference to FIGS. 8, 9, 10, 11, and 12 are logical units, and do not necessarily correspond to separate physical units. Thus, the person skilled in the art would appreciate that the units disclosed in the FIGS. 8, 9, 10, 11, and 12 may be implemented as physically integrated units, and/or physically separate units, and that the units are provided with appropriate processing circuits.

The above described technology implies a number of advantages to different users of lawful interception systems, e.g. manufactures, operators, LEAs, etc.:

Solution which makes a smart usage of the available bandwidth allows operators to respond LEA needs by saving investments in bandwidth and transport expenses;
    The presence of UDP protocol requires less elaboration capacity to the equipment on the authority site due to the possibility to decode partial CC stream in case of loss UDP packets, e.g. video stream with some packets loss;
    UDP reduces the jitter of the multimedia streams so the LEA can analyze these streams as soon as received.

TCP is connection-oriented protocol. When a file or message is sent, it will be delivered unless connection fails. If connection lost, the server will request the lost part. There is no corruption while transferring a message. This makes the TCP protocol a more reliable protocol than UDP. UDP is connectionless protocol. When data or message according to UDP is sent, it is not known if it will receive its destination, it could get lost on the way. There may be corruption while transferring a message.

On the other side UDP has no ordering of messages, no tracking connections, etc. It's just fire and forget! This means it's a lot quicker. TCP is slower as when the low level parts of a TCP "stream" arrive in the wrong order, resend requests have to be sent, and all the out of sequence parts have to be put back together, so requires a bit of work to piece together. The TCP header is therefore much larger than the UDP header and in addition it is applied to every segment.

A number of embodiments of the present technique have been described. It will be understood that various modifications may be made without departing from the subject-matter of the following claims. Therefore, other implementations are within the scope of the following claims.

ABBREVIATION LIST

SGW Serving Gateway
PGW Public Data Network Gateway
PDN Public Data Network
CN Core Network
GGSN Gateway GPRS Support Node
GPRS General Packet Radio Packet Service
3GPP Third Generation Partnership Project
LTE Long Term Evolution
MME Mobility Management Entity
HI Handover Interface
HLR Home Location Register
HSS Home Subscriber Server
LI Lawful Intercept(-ion)
RAN Radio Access Network
DF Delivery Function
MF Mediation Function
LEMF Law Enforcement Monitoring Facility
ADMF Administration Function
LEA Law Enforcement Agency
IP Internet Protocol
eNB base station in LTE system
LAN Local Area Network
WLAN Wireless LAN
WAN Wide Area Network

REFERENCE LIST

ETSI ES 201 671 V3.1.1 (2006-10), *Lawful Interception (LI); Handover interface for the lawful interception of*

*telecommunications traffic* http://www.etsi.org/deliver/etsi_es/201600_201699/201671/03.01.01_50/es_201671v030101m.pdf

The invention claimed is:

1. A method in a Lawful Intercept (LI) system comprising at least one Intercept Access Point (IAP) for intercepting communication traffic using User Datagram Protocol (UDP) and Transmission Control Protocol (TCP) packets in one or more communications networks and delivering said communication traffic as Communication Content (CC) to a Law Enforcement Agency (LEA) via a mediation functionality controlled by an administration functionality, wherein the method comprises:
   receiving CC as UDP and TCP;
   storing UDP and TCP CC in a buffer arrangement;
   forwarding UDP CC via one of a first CC handover interface and a second CC handover interface, separated from the first CC handover interface, to the LEA;
   comparing a measure value of used storage capacity of the buffer arrangement to a threshold value;
   generating a synchronization notification when the measure value is equal to or exceeds the threshold value;
   sending the synchronization notification towards the LEA;
   receiving a request for synchronization for retransmission of lost UDP CC packets from the LEA in response to the synchronization notification;
   obtaining the lost UDP CC packets from the buffer arrangement; and
   sending the lost UDP CC packets as TCP packets via a selected one of the first CC handover interface and the second CC handover interface.

2. The method according to claim 1, wherein the receiving the request for synchronization involves receiving the request for synchronization of lost UDP CC packets from the LEA via the administration functionality.

3. The method according to claim 1, wherein the request for synchronization comprises a flow identifier of a specific CC stream generated by an intercepted user, and LI-header sequence numbers of the lost UDP CC packets.

4. The method according to claim 1, wherein the sending of the synchronization notification further comprises:
   sending the synchronization notification towards the LEA via the administration functionality.

5. A Lawful Intercept (LI) system comprising at least one Intercept Access Point (IAP) for intercepting communication traffic using User Datagram Protocol (UDP) and Transmission Control Protocol (TCP) packets in one or more communications networks and delivering said communication traffic as Communication Content (CC) to a Law Enforcement Agency (LEA) via a mediation functionality controlled by an administration functionality, wherein the mediation functionality comprises a buffer controller comprising a communication interface and a processing circuitry, said buffer controller to perform operations to:
   receive CC as UDP and TCP by means of the communication interface;
   store UDP and TCP CC in a buffer storage;
   forward UDP CC via one of a first CC handover interface and a second CC handover interface separated from the first CC handover interface to the LEA;
   compare a measure value of used capacity of the buffer storage to a threshold value;
   generate a synchronization notification when the measure value is equal to or exceeds the threshold value;
   send the synchronization notification towards the LEA;
   receive a request for synchronization for retransmission of lost UDP CC packets from the LEA in response to the synchronization notification;
   obtain the lost UDP CC packets from the buffer storage; and
   send the lost UDP CC packets as TCP packets via a selected one of the first CC handover interface and the second CC handover interface.

6. The LI system according to claim 5, wherein the buffer controller further to perform operations to:
   receive the request for synchronization of lost UDP CC packets from the LEA via the administration functionality.

7. The LI system according to claim 5, wherein the request for synchronization comprises a flow identifier of a specific CC stream generated by an intercepted user, and LI-header sequence numbers of the lost UDP CC packets.

8. The LI system according to claim 5, wherein the buffer controller further to perform operations to:
   send the synchronization notification towards the LEA via the administration functionality.

9. The LI system according to claim 5, wherein the administration functionality of the LI system further comprises a synchronization handler to perform operations to:
   receive the request for synchronization of the lost UDP CC packets from the LEA; and
   send the request for synchronization of lost UDP CC packets from the LEA to the buffer controller.

10. The LI system according to claim 9, wherein a communication interface of the synchronization handler to receive the request for synchronization of the lost UDP CC packets from the LEA via a handover interface separate from a standardized handover interface.

11. The LI system according to claim 9, wherein the synchronization handler to perform operations to:
   receive the synchronization notification from the buffer controller; and
   send the synchronization notification towards the LEA.

12. The LI system according to claim 9, wherein the synchronization handler to send the synchronization notification towards the LEA via a handover interface separate from a standardized handover interface.

13. The LI system according to claim 5, wherein the mediation functionality comprises an IP packet router, which is to forward TCP CC and UDP CC on different ones of the first CC handover interface and the second CC handover interface, depending on an indication indicating whether the CC comprises TCP or UDP packets, which indication is provided by the buffer controller.

* * * * *